(12) United States Patent
Gunji

(10) Patent No.: US 9,009,331 B2
(45) Date of Patent: Apr. 14, 2015

(54) COMMUNICATION DEVICE, CONTROL METHOD THEREOF AND STORAGE MEDIUM

(75) Inventor: Daisuke Gunji, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 356 days.

(21) Appl. No.: 13/569,520

(22) Filed: Aug. 8, 2012

(65) Prior Publication Data

US 2013/0073736 A1 Mar. 21, 2013

(30) Foreign Application Priority Data

Sep. 20, 2011 (JP) .................... 2011-205232

(51) Int. Cl.
*G06F 15/16* (2006.01)
*H04L 29/08* (2006.01)
*H04L 29/06* (2006.01)
*H04W 4/18* (2009.01)

(52) U.S. Cl.
CPC ............... *H04L 67/06* (2013.01); *H04L 69/18* (2013.01); *H04W 4/18* (2013.01)

(58) Field of Classification Search
CPC  H04L 67/46; H04L 29/06095; H04W 76/025
USPC ................... 709/219, 227; 370/254
See application file for complete search history.

(56) References Cited

U.S. PATENT DOCUMENTS

| | | | | |
|---|---|---|---|---|
| 8,639,260 B2* | 1/2014 | Fox et al. | ............. | 455/452.1 |
| 2007/0288593 A1* | 12/2007 | Wang | ............. | 709/217 |
| 2008/0022012 A1* | 1/2008 | Wang | ............. | 709/238 |
| 2009/0276311 A1* | 11/2009 | Pujet et al. | ............. | 705/14.52 |
| 2012/0270567 A1* | 10/2012 | Johnson | ............. | 455/456.3 |

FOREIGN PATENT DOCUMENTS

JP  2004-295722  10/2004
JP  2008-182646  8/2008

* cited by examiner

*Primary Examiner* — Frantz Jean
(74) *Attorney, Agent, or Firm* — Cowan, Liebowitz & Latman, P.C.

(57) ABSTRACT

A communication device configured to receive content from a server via a network, comprises a storage unit configured to store content received from the server in a cache, a display unit configured to display the content stored in the storage unit, a control unit configured to switch connection to the network to one of a plurality of communication lines having different communication rates, and a setting unit configured to set the size of the content received from the server and the number of histories stored in the cache, in accordance with the communication line to which connection has been switched by the control unit.

13 Claims, 6 Drawing Sheets

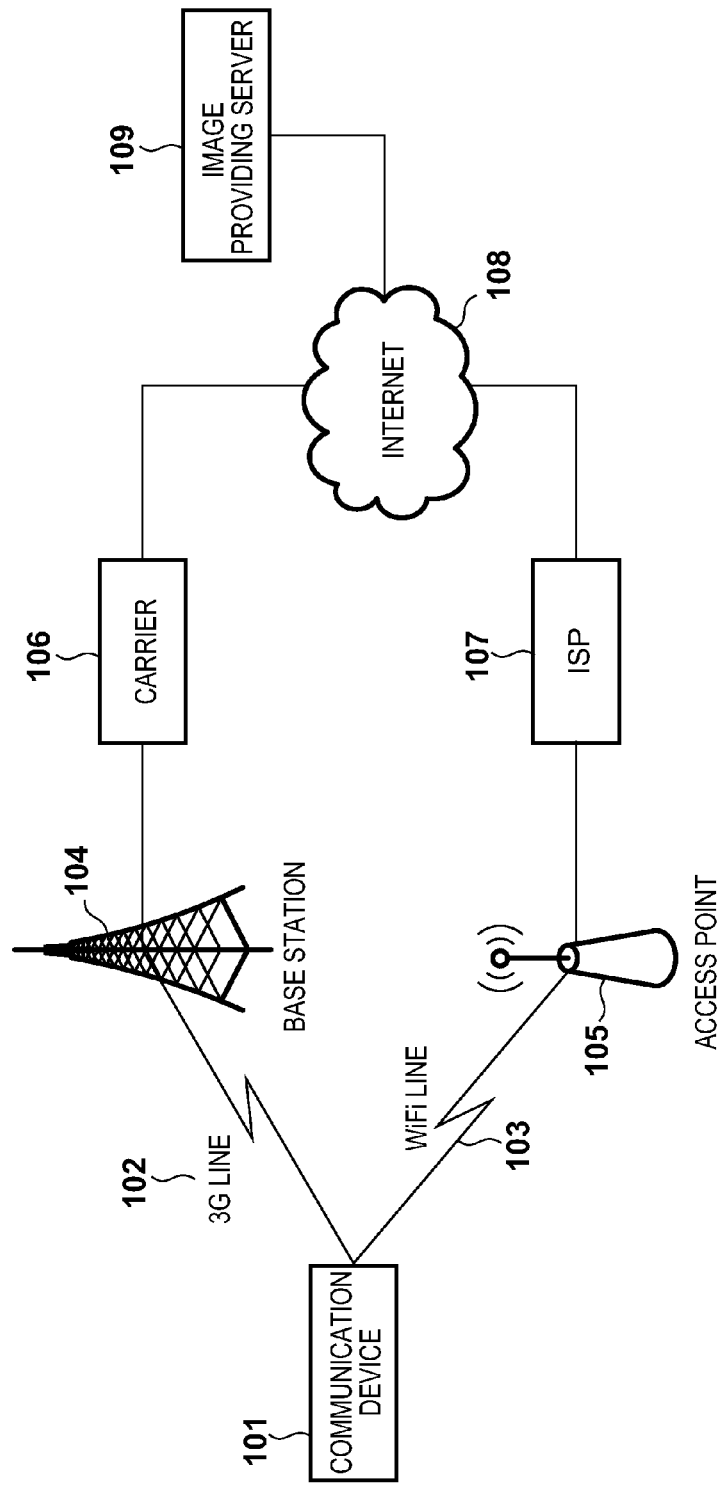

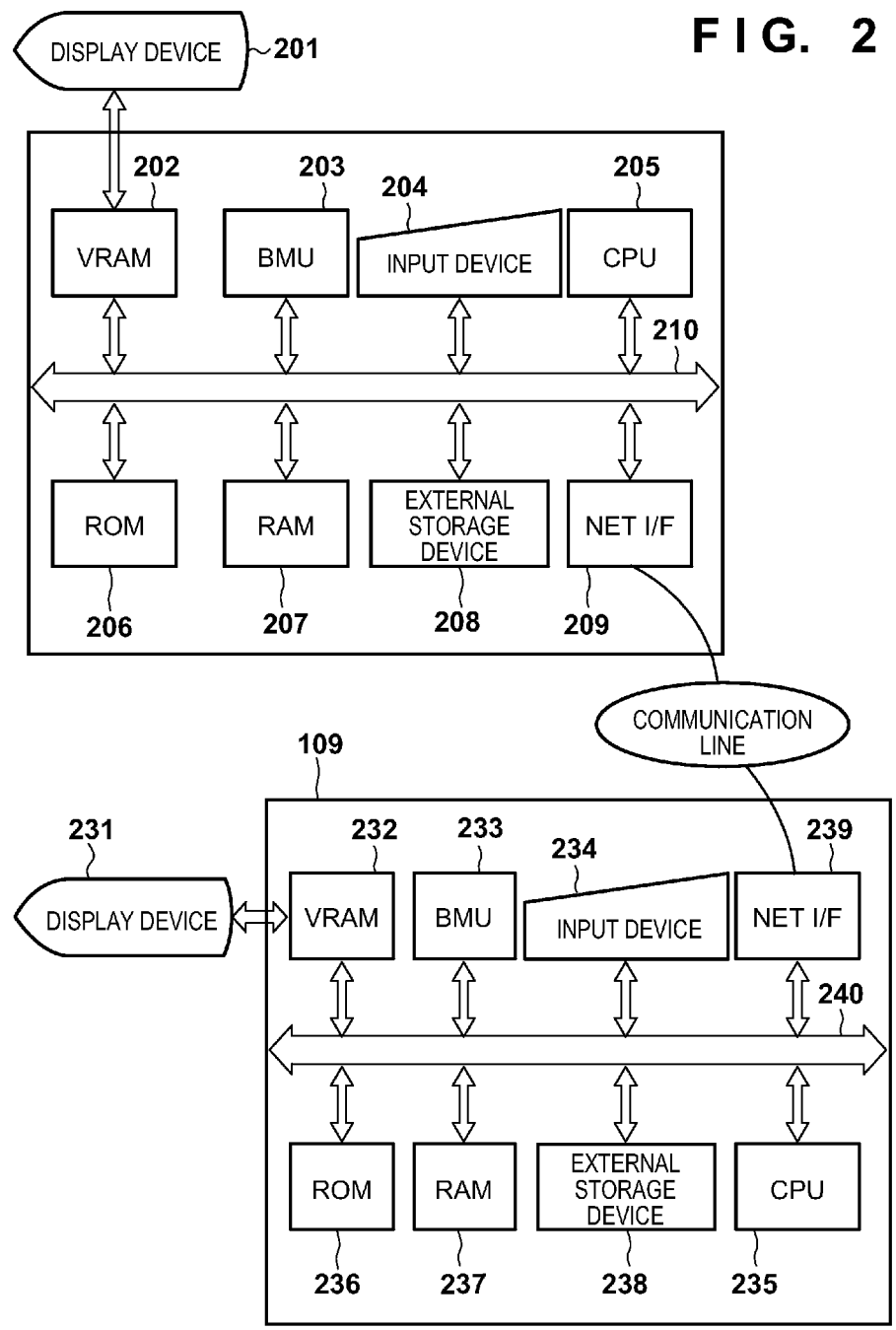

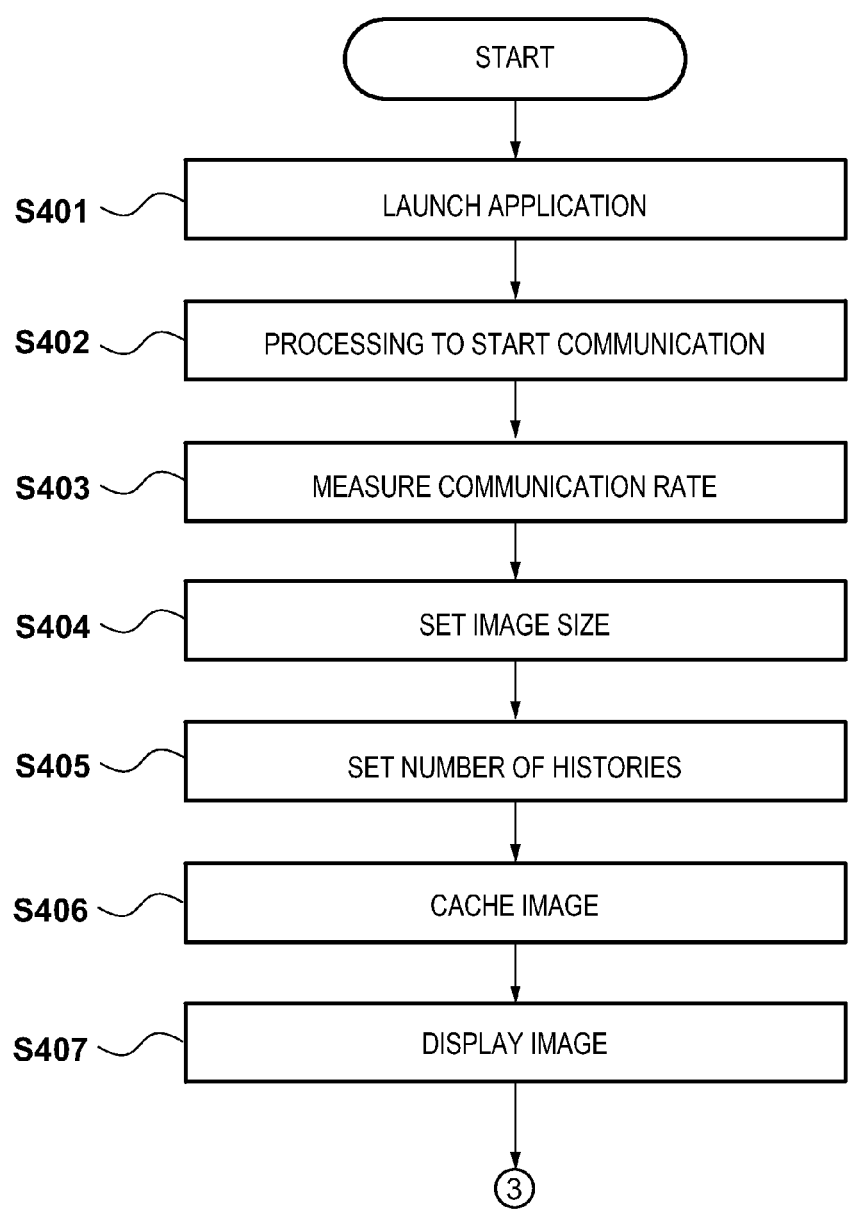

COMMUNICATION DEVICE, CONTROL METHOD THEREOF AND STORAGE MEDIUM

BACKGROUND OF THE INVENTION

1. Field of the Invention

The present invention relates to control of a communication device configured to receive content via a network.

2. Description of the Related Art

Japanese Patent Laid-Open No. 2008-182646 discloses carrying out communication by switching, as needed, to an optimum line of a plurality of different types of lines having different data transfer capacities in a communication device. Japanese Patent Laid-Open No. 2004-295722 discloses that a client computer receives page information from a web server and stores the received page information in a cache, and, when an instruction to display the same page information again is given, the client computer reads out the page information from the cache and displays the read-out page information, without receiving the page information from the web server again.

In general, when a low-speed communication line such as the 3G line is used, it takes longer time to receive data, than when a high-speed communication line such as the WiFi line is used. Therefore, when a low-speed communication line is used, it is necessary to store as much information as possible in a cache (history) so as to avoid taking time obtaining the same information repeatedly. On the other hand, there is also the problem that leaving a large amount of information in the cache will cause a shortage of the storage capacity of the communication device.

SUMMARY OF THE INVENTION

The present invention has been made in consideration of the aforementioned problems, and realizes higher data quality and higher-speed processing by optimizing the amount of data received and the number of histories stored in a cache, in consideration of the communication rate of lines and the resource for the storage capacity used by a communication device.

In order to solve the aforementioned problems, the present invention provides a communication device configured to receive content from a server via a network, comprising: a storage unit configured to store content received from the server in a cache; a display unit configured to display the content stored in the storage unit; a control unit configured to switch connection to the network to one of a plurality of communication lines having different communication rates; and a setting unit configured to set the size of the content received from the server and the number of histories stored in the cache, in accordance with the communication line to which connection has been switched by the control unit.

In order to solve the aforementioned problems, the present invention provides a method of controlling a communication device configured to receive content from a server via a network, the method comprising: a storing step of storing content received from the server in a cache; a display step of displaying the content stored in the cache; a control step of switching connection to the network to one of a plurality of communication lines having different communication rates; and a setting step of setting the size of the content received from the server and the number of histories stored in the cache, in accordance with the communication line to which connection has been switched by the control step.

According to the present invention, it is possible to realize higher data quality and higher-speed processing by optimizing the amount of data received and the number of histories stored in a cache, in consideration of the communication rate of lines device and the resource for the storage capacity used by a communication device.

Further features of the present invention will become apparent from the following description of exemplary embodiments (with reference to the attached drawings).

BRIEF DESCRIPTION OF THE DRAWINGS

FIG. 1 is a system configuration diagram according to an embodiment of the present invention.

FIG. 2 is a block diagram showing the configurations of a communication device and an image providing server according to the present embodiment.

FIGS. 4A and 4B are operation flowcharts of a communication device according to the second embodiment.

DESCRIPTION OF THE EMBODIMENTS

Figure 3A:
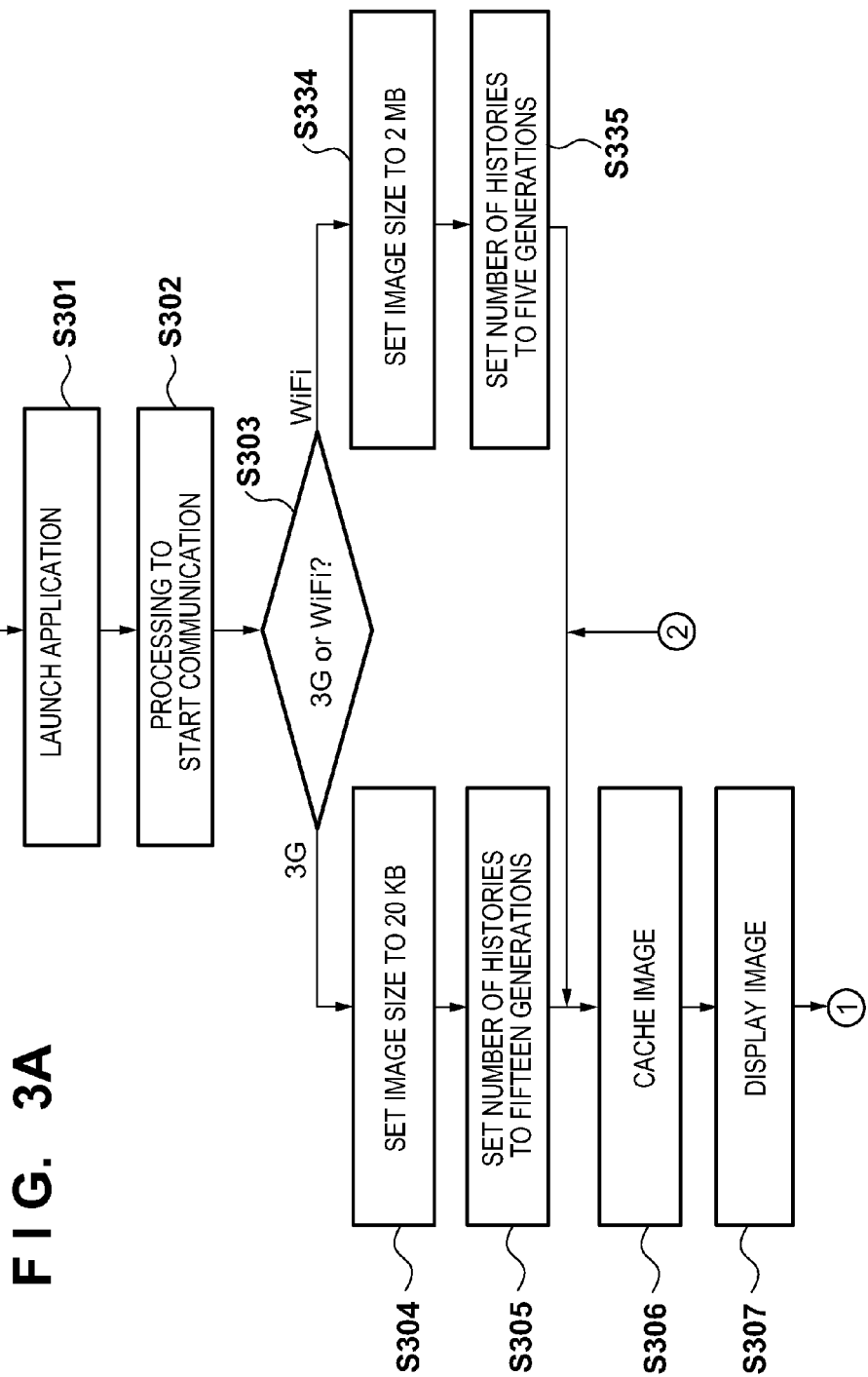
FIGS. 3A and 3B are operation flowcharts of a communication device according to the first embodiment.

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

Referring to FIG. 1, a communication system according to the present embodiment will be described.

In FIG. 1, a communication device 101 carries out communications by appropriately switching between a HSPDA (3G) line, which is also used for telephone calls, and a WiFi line, which can connect to the Internet via an access point of a nearby wireless LAN. More specifically, the communication device 101 carries out communications by switching between a path in which it accesses a base station 104 through a 3G line 102 and then accesses an image providing server 109 from a carrier 106 via the Internet 108, and a path in which it accesses an access point 105 via a WiFi line 103 and then accesses the image providing server 109 from an ISP (Internet Service Provider) 107 via the Internet 108.

Although the 3G line is described as a low-speed first communication line and the WiFi line as a high-speed second communication line in an example shown in the first embodiment, the present invention is not limited to these designations of lines or any particular lines, and is applicable to any communication device that switches between a plurality of communication lines for use. For example, the present invention is also applicable to LTE (Long Term Evolution) called the 3.9th generation or the fourth generation.

When communicating with the image providing server 109, the communication device 101 can switch between the WiFi line and the 3G line.

The image providing server 109 retains content files such as an image file, a music file, and a Web page file, and provides content to the communication device 101 through the WiFi line or the 3G line.

The WiFi line 103 provides a line that connects to the Internet via an access point of a wireless LAN in close proximity to the communication device. WiFi lines have high rates as lines used by portable communication devices, and some of them have theoretical values of communication rates of 11 Mbps and 54 Mbps. In the present embodiment, it is assumed that the WiFi line 103 has a communication rate of 10 MB/s.

The 3G line 102 provides a line that connects to the Internet 108 via the base station 104. 3G lines used to have high rates as lines used by portable communication devices, but have now become relatively low-speed lines. The theoretical value of the communication rate of HSPDA (High-Speed Downlink Packet Access) is 3.6 Mbps. In the present embodiment, it is assumed that the 3G line 102 has a communication rate of 1 MB/s.

<Device Configuration>

Referring to FIG. 2, the configurations of the communication device 101 and the image providing server 109 according to the present embodiment will be described.

In FIG. 2, a display device 201 displays a content file received by the communication device 101 from the image providing server 109. Also, the display devices 201 and 231 display user interface information such as icons and messages.

VRAMs 202 and 232 render image data for being displayed in the display device 201. The image data generated in the VRAMs 202 and 232 is transferred to the display devices 201 and 231 according to a predetermined rule, and, thereby, the display devices 201 and 231 display an image.

BMUs (bit move units) 203 and 233 control data transfer, for example, between memories (e.g., between the VRAMs 202 and 232 and another memory), and data transfer between a memory and I/O devices (e.g., NET I/Fs 209 and 239).

Input devices 204 and 234 include various keys, such as a keyboard, a numeric keypad, and a pointing device, for inputting a document and the like and indicating an icon, a menu, and other content displayed in the display devices 201 and 231.

CPUs 205 and 235 control various devices based on control programs stored in ROMs 206 and 236 and external storage devices 208 and 238.

The ROMs 206 and 236 store various control programs and data.

RAMs 207 and 237 include, for example, work areas for the CPUs 205 and 235, data save areas used during error processing, and load areas for control programs.

The external storage devices 208 and 238 store control programs executed in the communication device, content files, and data. The external storage devices 208 and 238 include a storage medium, which is one type of ROMs, such as a flash memory. The external storage device 208 stores (caches), as a history, a content file such as an image received from the image providing server 109. The external storage device 208 also stores a content browser application software program (hereinafter, referred to as a "browser application"). Furthermore, the external storage devices 208 and 238 store an operating system (OS).

The communication device 101 and the image providing server 109 communicate with each other using NET I/Fs 209 and 239 via a network.

CPU buses 210 and 240 include an address bus, a data bus, and a control bus.

Control programs can be provided to the CPUs 205 and 235 from the ROMs 206 and 236 or the external storage devices 208 and 238, or can be provided from other information processing apparatuses through NET I/Fs 209 and 239 via a network.

<Description of Operation>

Figure 3B:
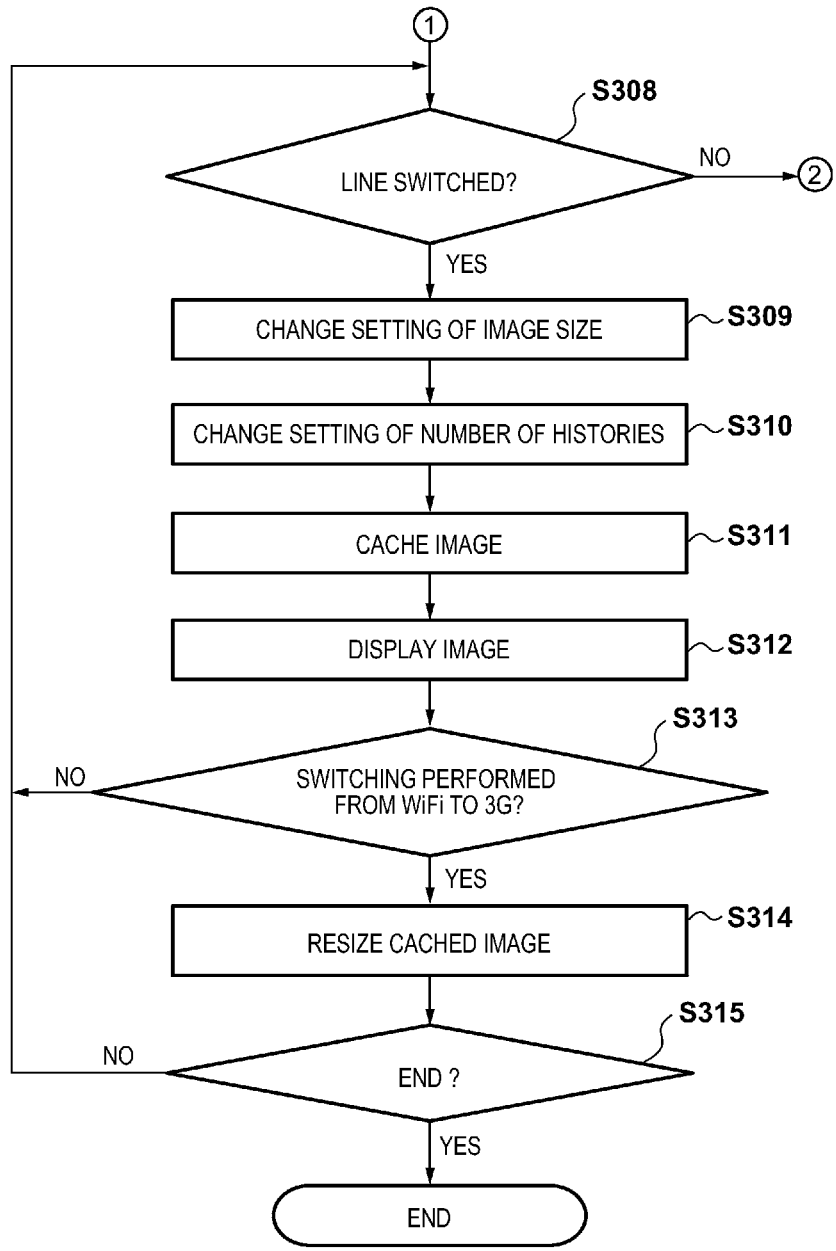

Referring to FIGS. 2 to 3B, a description will be given of a case where an image file is browsed in the communication device according to the present embodiment. Note that the following processing is realized by the CPU 205 executing a browser application.

In FIG. 3A, in step S301, the CPU 205 launches a browser application to start an operation.

In step S302, the CPU 205 performs processing to start communicating with the image providing server 109. Here, the URL of the image providing server 109 is input, and the type of communication lines is selected.

In step S303, the CPU 205 determines whether the communication line used is the 3G line 102 or the WiFi line 103. If it is determined to be the 3G line 102, the procedure moves to step S304. If it is determined to be the WiFi line 103, the procedure moves to step S334.

In step S304, the CPU 205 sets the upper limit of the size of an image file obtained from the image providing server 109 to a value corresponding to the 3G line 102 (e.g., 20 KB) and stores the set value in the RAM 207.

In step S305, the CPU 205 sets the upper limit of the number of histories stored in the external storage device 208 to a value corresponding to the 3G line 102 (e.g., fifteen generations) and stores the set value in the RAM 207.

In step S334, the CPU 205 sets the upper limit of the size of an image file obtained from the image providing server 109 to a value corresponding to the WiFi line 103 (e.g., 2 MB).

In step S335, the CPU 205 sets the upper limit of the number of histories stored (cached) in the external storage device 208 to a value corresponding to the WiFi line 103 (e.g., five generations).

In step S306, the CPU 205 receives an image file from the image providing server 109 with the file size set in step S304 or S334 as the upper limit, and stores (caches) the received image file in the external storage device 208 as a history.

In step S307, the CPU 205 displays the image file received in step S306 in the display device 201. Note that, in step S306, when the number of histories present in the external storage device 208 exceeds the value set in step S305 or S335, a new image file is stored (cached) in the external storage device 208 after deleting the image file with the oldest storage date.

In FIG. 3B, in step S308, the CPU 205 determines whether or not the communication line has been switched. The communication device 101 can switch the communication line in the middle of communication with the image providing server 109, in accordance with a user operation or the state of the communication. Here, if the communication line has been switched, the procedure moves to step S309, and if it has not been switched, the procedure returns to step S306.

In step S309, the CPU 205 changes the upper limit of the size of an image file received from the image providing server 109 to a value corresponding to the type of the communication line after switching. For example, when switching is performed from the 3G line to the WiFi line, the upper limit is changed from 20 KB to 2 MB. When switching is performed from the WiFi line to the 3G line, the upper limit is changed from 2 MB to 20 KB.

In step S310, the CPU 205 changes the number of histories stored in the external storage device 208 to a value corresponding to the type of the communication line after switching. For example, when switching is performed from the 3G line to the WiFi line, the number of histories is changed from fifteen generations to five generations. When switching is performed from the WiFi line to the 3G line, the number of histories is changed from five generations to fifteen generations.

In step S311, the CPU 205 receives an image file from the image providing server 109 with the file size changed in step S309 as the upper limit, and stores (caches) the received image file in the external storage device 208 as a history.

In step S312, the CPU 205 displays the image file in the display device 201. Note that, in step S311, when the number of histories stored (cached) in the external storage device 208 exceeds the value changed in step S310, a new image file is stored (cached) after deleting image files in ascending order of the storage dates.

In step S313, the CPU 205 determines whether switching is performed from the WiFi line 103 to the 3G line 102. Here, if switching is performed from the WiFi line to the 3G line, the CPU 205 resizes, among image files stored (cached) in the external storage device 208, any image file with an upper limit exceeding the file size corresponding to the 3G line to the upper limit for the 3G line (S314). Note that, for example, the number of pixels, the compression ratio of JPEG or the like, the number of colors, the encoding method, or the code allocation method may be changed in order to resize image files.

In step S315, the CPU 205 determines whether or not to end the communication. If the communication is not to be ended, the procedure returns to step S308.

Note that, when switching is performed from the 3G line to the WiFi line in step S313, a file corresponding to any of image files stored (cached) in the external storage device 208 and having a size larger than that of the stored corresponding image file may be received from the image providing server 109 again.

According to the first embodiment described thus far, during communication of the communication device 101 with the image providing server 109, the file size is decreased and the number of histories stored in the cache is increased when a low-speed communication line is used than when a high-speed communication line. This makes it possible to realize higher image quality and higher-speed display processing by optimizing the size of an image file received and the number of histories stored in a cache, in consideration of the communication rate of lines and the resource for the storage capacity used by a communication device.

Second Embodiment

In the second embodiment, the communication device 101 measures the communication rate (effective value) of the communication line being used, and sets the file size and the number of histories in accordance with the measured result.

<Description of Operation>

Referring to FIGS. 2 to 4B, a description will be given of a case where an image file is browsed in a communication device according to the present embodiment. Note that the following processing is realized by the CPU 205 executing a browser application.

In FIG. 4A, in steps S401 and S402, the same processing as that performed in steps S301 and S302 in FIG. 3A is performed.

Next, in step S403, the CPU 205 measures the communication rate of the communication line being used. It is assumed here that the measured result was 5 MB/s.

In step S404, the CPU 205 sets the upper limit of the size of a file received from the image providing server 109, in accordance with the measured result obtained in step S403. More specifically, the CPU 205 sets, as the upper limits of the file size, 2 MB for a communication rate of 6 MB/s or more, 1 MB for a communication rate of 5 MB/s or more and less than 6 MB/s, 512 KB for a communication rate of 4 MB/s or more and less than 5 MB/s, 256 KB for a communication rate of 3 MB/s or more and less than 4 MB/s, 128 KB for a communication rate of 2 MB/s or more and less than 3 MB/s, 64 KB for a communication rate of 1 MB/s or more and less than 2 MB/s, and 20 KB for a communication rate of less than 1 MB/s, and stores the set upper limits in the RAM 207. Since it is assumed in this case that the communication rate is 5 MB/s in step S403, the CPU 205 sets the upper limit of the file size to 1 MB.

In step S405, the CPU 205 sets the number of histories stored (cached) in the external storage device 208, in accordance with the measured result obtained in step S403. More specifically, the number of histories are set to nine generations for a communication rate of 6 MB/s or more, ten generations for a communication rate of 5 MB/s or more and less than 6 MB/s, eleven generations for a communication rate of 4 MB/s or more and less than 5 MB/s, twelve generations for a communication rate of 3 MB/s or more and less than 4 MB/s, thirteen generations for a communication rate of 2 MB/s or more and less than 3 MB/s, fourteen generations for a communication rate of 1 MB/s or more and less than a 2 MB/s, and fifteen generations for a communication rate of less than 1 MB/s. Since it is assumed in this case that the communication rate measured in step S403 is 5 MB/s, the CPU 205 sets the number of histories to ten generations. Thereafter, in steps S406 and S407, the same processing as that performed in steps S306 and S307 in FIG. 3A is performed.

Figure 4B:
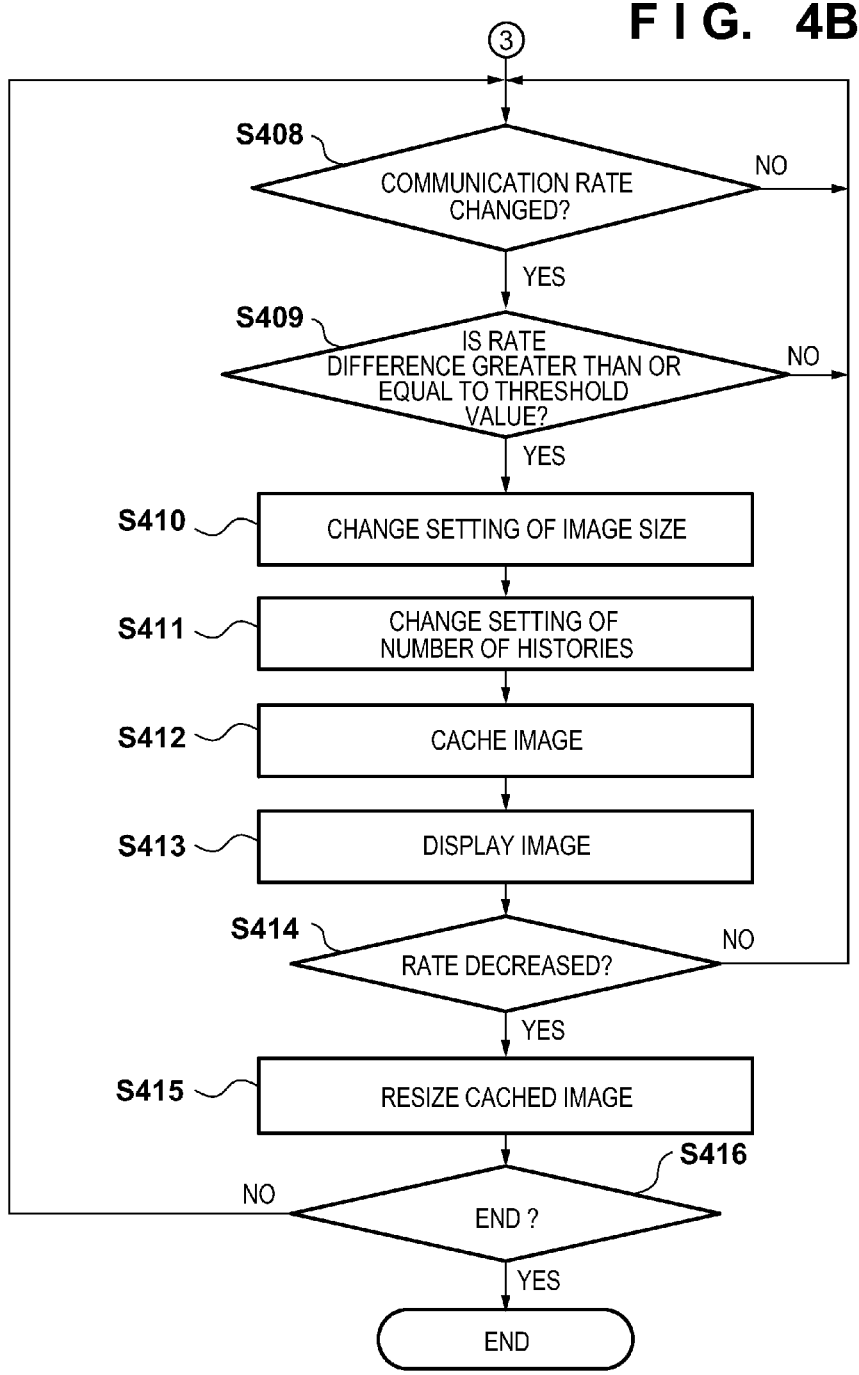

In FIG. 4B, in step S408, the CPU 205 determines whether or not the communication rate of the communication line being used has changed. If the communication rate has changed, the procedure moves to step S409, and, if the communication rate has not changed, the procedure returns to step S408.

In step S409, the CPU 205 determines whether the rate difference when the communication rate has changed is greater than or equal to a threshold value. In the present embodiment, the threshold value is 1 MB/s. If the rate difference is greater than or equal to the threshold value, the same processing as that performed in steps S309 to S312 in FIG. 3B is performed in steps S410 to S413. If, on the other hand, the rate difference is less than the threshold value, the procedure returns to step S408.

In step S414, the CPU 205 determines whether or not the communication rate has decreased than before. If the communication rate has decreased, the procedure moves to step S415. If the communication rate has increased rather than decreasing, the procedure returns to step S408. In step S415, the same processing as that performed in step S314 in FIG. 3B is performed.

In step S416, the CPU 205 determines whether or not to end the communication. If the communication is not to be ended, the procedure returns to step S408.

According to the second embodiment, the communication rate of the communication line being used is measured in the communication device, and it is therefore possible to achieve the same effect as with the first embodiment even if three or more types of communication lines are switched for use.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-205232, filed Sep. 20, 2011, which is hereby incorporated by reference herein in its entirety.

What is claimed is:

1. A communication device comprising:
   a receiver unit configured to receive content from a server via a network;
   a storage unit configured to store the received content in a cache;
   a display unit configured to display the stored content;
   a selection unit configured to select one of a plurality of communication lines which have different communication rates;
   a control unit configured to switch connection to the network to the selected communication line; and
   a setting unit configured to set a limit of a size of the content received from the server and a limit of a number of the content stored in the cache corresponding to the selected communication line,
   wherein the receiver unit receives content according to the limit of the size by using the selected communication line and the storage unit stores the received content in the cache according to the limit of the number.

2. The device according to claim 1,
   wherein, when connection has been switched by the control unit to a communication line having a lower communication rate, the setting unit decreases the limit of the size of the content received from the server, while increasing the limit of the number of the content.

3. The device according to claim 1,
   wherein, when connection has been switched by the control unit to a communication line having a higher communication rate, the setting unit increases the limit of the size of the content received from the server, while decreasing the limit of the number of the content.

4. The device according to claim 1, further comprising:
   a resizing unit configured to resize, when connection has been switched by the control unit to a communication line having a lower communication rate, among the content stored in the storage unit, content having a size exceeding an upper limit corresponding to the communication line after switching, to a size corresponding to the upper limit.

5. The device according to claim 1,
   wherein, when connection has been switched by the control unit to a communication line having a higher communication rate, the device is configured to receive from the server again, content that is the same as the content stored in the storage unit and that has a larger size.

6. The device according to claim 1, further comprising:
   a measuring unit configured to measure the communication rate of the communication line to which connection has been switched by the control unit,
   wherein, when the rate difference with the communication line after switching is greater than or equal to a threshold value, the setting unit sets the limit of the size of the content received from the server and the limit of the number of the content.

7. A method of controlling a communication device the method comprising:
   a receiving step of receiving content from a server via a network;
   a storing step of storing the received content in a cache;
   a display step of displaying the stored content;
   a selection step of selecting one of a plurality of communication lines which have different communication rates;
   a control step of switching connection to the network to the selected communication line; and
   a setting step of setting a limit of a size of the content received from the server and a limit of a number of the content stored in the cache corresponding to the selected communication line,
   wherein, in the receiving step, content is received according to the limit of the size by using the selected communication line and, in the storing step, the received content is stored in the cache according to the limit of the number.

8. The method according to claim 7,
   wherein, when connection has been switched by the control step to a communication line having a lower communication rate, the setting step decreases the limit of the size of the content received from the server, while increasing the limit of the number of the content.

9. The method according to claim 7,
   wherein, when connection has been switched by the control step to a communication line having a higher communication rate, the setting step increases the limit of the size of the content received from the server, while decreasing the limit of the number of the content.

10. The method according to claim 7, further comprising:
    a resizing step of resizing, when connection has been switched by the control step to a communication line having a lower communication rate, among the content stored in the cache, content having a size exceeding an upper limit corresponding to the communication line after switching, to a size corresponding to the upper limit.

11. The method according to claim 7, further comprising:
    a step of receiving from the server again, when connection has been switched by the control step to a communication line having a higher communication rate, content that is the same as the content stored in the cache and that has a larger size.

12. The method according to claim 7, further comprising:
    a measuring step of measuring the communication rate of the communication line to which connection has been switched by the control step,
    wherein, when the rate difference with the communication line after switching is greater than or equal to a threshold value, the setting step sets the limit of the size of the content received from the server and the limit of the number of the content.

13. A non-transitory computer-readable storage medium storing a program for causing a computer to execute the control method according to claim 7.

* * * * *